United States Patent
Xiao et al.

(10) Patent No.: US 9,347,311 B2
(45) Date of Patent: May 24, 2016

(54) SYSTEMS AND METHODS FOR GROUND FAULT IMMUNE DATA MEASUREMENT SYSTEMS FOR ELECTRONIC SUBMERSIBLE PUMPS

(71) Applicant: Saudi Arabian Oil Company, Dhahran (SA)

(72) Inventors: Jinjiang Xiao, Dhahran (SA); Michael Manning, Falmouth (GB)

(73) Assignee: Saudi Arabian Oil Company, Dharan (SA)

( * ) Notice: Subject to any disclaimer, the term of this patent is extended or adjusted under 35 U.S.C. 154(b) by 249 days.

(21) Appl. No.: 13/952,633

(22) Filed: Jul. 28, 2013

(65) Prior Publication Data

US 2015/0029036 A1    Jan. 29, 2015

(51) Int. Cl.
| | |
|---|---|
| G01V 3/00 | (2006.01) |
| H04Q 9/00 | (2006.01) |
| G08C 19/22 | (2006.01) |
| G08C 19/16 | (2006.01) |
| G08C 19/10 | (2006.01) |
| E21B 47/12 | (2012.01) |
| E21B 43/12 | (2006.01) |
| E21B 47/00 | (2012.01) |
| H04B 3/54 | (2006.01) |

(52) U.S. Cl.
CPC ............. *E21B 47/12* (2013.01); *E21B 43/128* (2013.01); *E21B 47/0007* (2013.01); *E21B 47/122* (2013.01); *H04B 3/54* (2013.01); *H04B 2203/5458* (2013.01); *H04B 2203/5466* (2013.01); *H04B 2203/5475* (2013.01); *H04B 2203/5483* (2013.01)

(58) Field of Classification Search
CPC ................. E21B 43/128; E21B 47/12; H04B 2203/5466; H04B 3/54

USPC ............... 340/853.1–856.4, 870.1–870.44; 166/104, 105–111; 702/6–14
See application file for complete search history.

(56) References Cited

U.S. PATENT DOCUMENTS

| | | | |
|---|---|---|---|
| 3,340,500 | A | 9/1967 | Boyd |
| 4,157,535 | A | 6/1979 | Balkanli |

(Continued)

FOREIGN PATENT DOCUMENTS

| | | |
|---|---|---|
| GB | 2394631 A | 4/2004 |
| GB | 2416097 A | 1/2006 |

(Continued)

OTHER PUBLICATIONS

Partial International Search Report for International Application No. PCT/IB2014/002065 mailed Jun. 26, 2015.

(Continued)

*Primary Examiner* — Firmin Backer
*Assistant Examiner* — Jerold Murphy
(74) *Attorney, Agent, or Firm* — Bracewell LLP; Constance G. Rhebergen

(57) ABSTRACT

Provided are systems and methods for ground fault immune data measurement system for electric submersible pumps. A data measurement system coupled to the ESP includes a surface unit coupled to a 3-phase power cable for providing power to a 3-phase motor of the ESP and a downhole unit coupled to the motor of the ESP and located downhole in a well. The downhole unit includes sensor and is configured to generate frequency modulated carrier signals for carrying the sensor data to the surface unit. Each of the frequency modulated carrier signals carries identical sensor data and is modulated to a different frequency. The carrier signals are shunted across the motor windings of the ESP motor and onto the 3-phase power cable via a capacitive coupling. Additionally, another carrier signal carrying control data may be transmitted from the surface unit to the downhole unit.

13 Claims, 12 Drawing Sheets

(56) References Cited

U.S. PATENT DOCUMENTS

| | | |
|---|---|---|
| 4,188,619 A | 2/1980 | Perkins |
| 6,396,415 B1 | 5/2002 | Bulmer |
| 7,248,178 B2 | 7/2007 | Layton |
| 7,982,633 B2 | 7/2011 | Booker |
| 8,138,622 B2 | 3/2012 | Besser |
| 8,342,238 B2 | 1/2013 | McCoy |
| 2003/0011489 A1 | 1/2003 | Viswanathan |
| 2004/0164876 A1 | 8/2004 | Krueger |
| 2010/0194585 A1 | 8/2010 | Skinner |
| 2012/0026003 A1* | 2/2012 | Layton .............. G01V 11/002 340/854.9 |
| 2012/0037354 A1 | 2/2012 | McCoy et al. |
| 2014/0102721 A1* | 4/2014 | Bespalov .............. E21B 33/072 166/385 |
| 2015/0022371 A1* | 1/2015 | Shanks .............. H04B 3/54 340/854.9 |

FOREIGN PATENT DOCUMENTS

| | | |
|---|---|---|
| GB | 2491823 A | 12/2012 |
| GB | 2500047 A | 9/2013 |
| WO | 0186831 A1 | 11/2001 |
| WO | 2008102170 A1 | 8/2008 |
| WO | 2013132231 A1 | 9/2013 |
| WO | 2013132232 A1 | 9/2013 |
| WO | 2013132233 A1 | 9/2013 |
| WO | 2013132234 A1 | 9/2013 |

OTHER PUBLICATIONS

Completed International Search Report and Written Opinion for PCT/IB2014/002065 dated Oct. 23, 2015.

* cited by examiner

SYSTEMS AND METHODS FOR GROUND FAULT IMMUNE DATA MEASUREMENT SYSTEMS FOR ELECTRONIC SUBMERSIBLE PUMPS

BACKGROUND OF THE INVENTION

1. Field of the Invention

This invention relates generally to data measurement systems used with downhole electric submersible pumps in wells and, more particularly, to data transmission and ground fault protection for such systems.

2. Description of the Related Art

Various drilling and production systems are employed to find and extract oil, natural gas, and other resources from the earth. Oil wells of such systems may have diminished production due to conditions in an oil reservoir and use artificial lift systems to improve oil production. Some artificial lift systems may use downhole electric submersible pumps to lift oil to the surface for recovery. An electric submersible pump may receive power from the surface, such as through a cable deployed alongside production tubing. The electric submersible pump assembly may also include a data measurement system that measures various parameters. The data measurement system typically receives power from the pump power cable and transmits data though the motor windings and to the surface via the power cable. However, the data transfer rate of such systems is limited by the electrical impedance of the motor windings and the power cable. Additionally, such systems are unable to transmit data in the event of either a partial or complete ground fault.

SUMMARY OF THE INVENTION

Various embodiments for systems and methods for ground fault immune data measurement system for electric submersible pumps are provided herein. In some embodiments, a data measurement system coupled to an electric submersible pump (ESP) is provided. The system includes a surface unit coupled to a 3-phase power cable, the 3-phase power cable coupled to a 3-phase motor of the ESP and a downhole unit coupled to the motor of the ESP and located downhole in a well. The downhole unit includes a plurality of sensors and a processor coupled to the sensors and configured to receive the sensor data. The downhole unit further includes a modulator coupled to the processor and configured to generate a plurality of frequency modulated carrier signals for carrying the sensor data to the surface unit, each of the plurality of frequency modulated carrier signals carrying identical sensor data and modulated to a unique frequency. Additionally, the downhole unit is capacitively coupled to motor windings of the motor of the ESP and configured to transmit the plurality of carrier signals across the capacitive coupling and to the surface unit via the 3-phase power cable.

In another embodiment, a method of transmitting data from a downhole region of a well is provided. The method includes receiving sensor data from a plurality of sensors located in a downhole unit of a data measurement system, the downhole unit located in the downhole region of the well and encoding the sensor data in a plurality of frequency modulated carrier signals via a modulator of the downhole unit. The method further includes multiplexing the plurality of carrier signals to produce multiplexed carrier signals via a multiplexer of the downhole unit and shunting the multiplexed carrier signals to a 3-phase power cable via a capacitive coupling across each motor winding of a 3-phase motor of an electric submersible pump. The method also transmitting the multiplexed carrier signals to a surface unit via each line of the 3-phase power cable.

In yet another embodiment, data measurement system coupled to an electric submersible pump (ESP) located in a downhole region of a well is provided. The data measurement system includes a plurality of sensors configured to produce sensor data and a processor configured to encode the sensor data in a first frequency modulated carrier signal at a first frequency, a second frequency modulated carrier signal at a second frequency, and a third frequency modulated carrier signal in a third frequency. The processor is further configured to decode control data received in a fourth frequency modulated carrier signal at a fourth frequency, wherein the first frequency, second frequency, third frequency, and fourth frequency are different frequencies. The data measurement system further includes a capacitive coupling to three motor windings of a 3-phase motor of the ESP, wherein the frequency modulated carrier signals are transmitted across the capacitive coupling to a 3-phase power cable.

Figure 1:
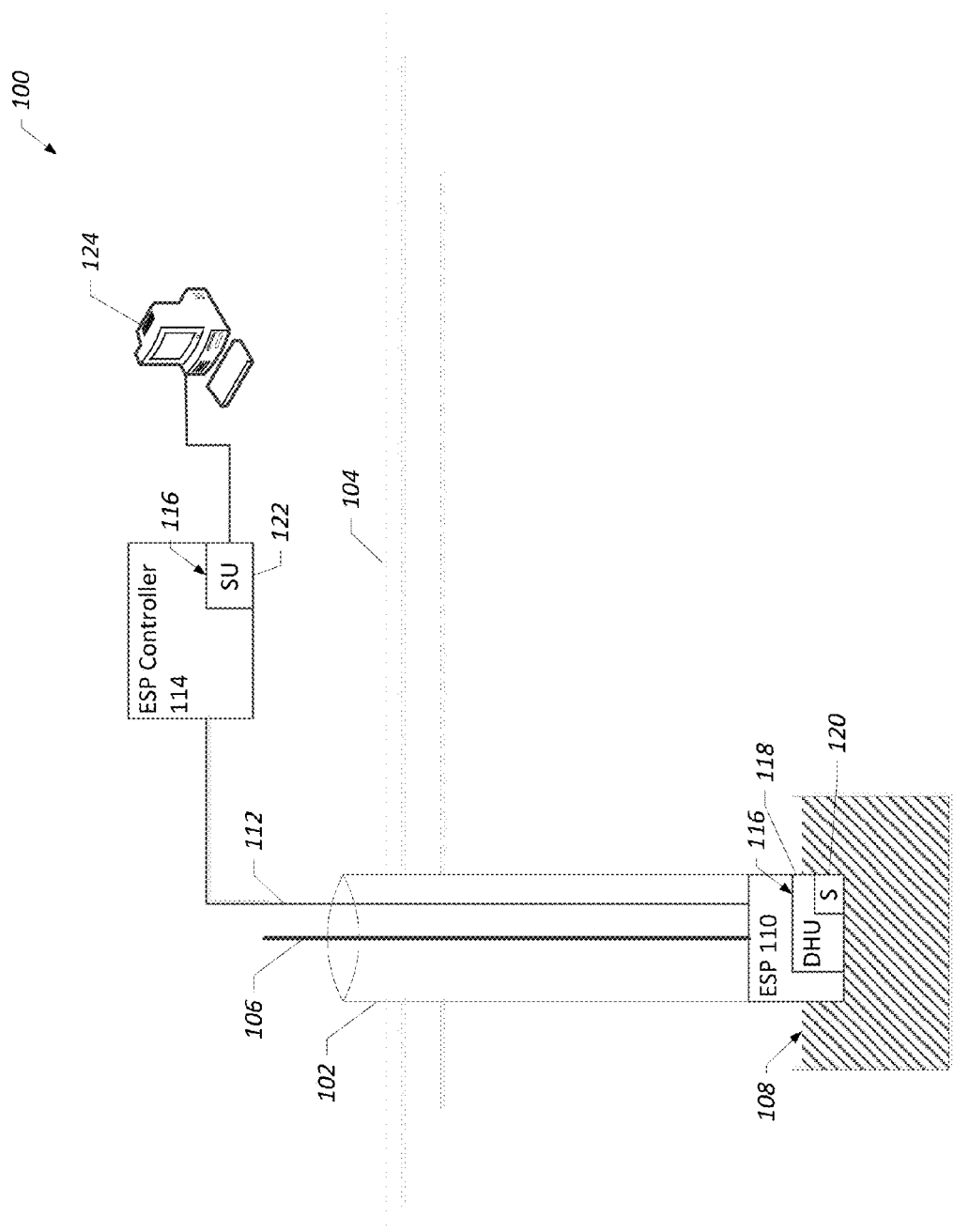
FIG. 1 is a schematic diagram of a system having an electric submersible pump in accordance with one or more embodiments of the present technique.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems and methods for ground fault immune data measurement systems for electric submersible pumps. A data measurement system includes a surface unit and a downhole unit coupled to an electric submersible pump downhole of a well. The surface unit may be located in a controller for the electric submersible pump that is also located on the surface and that provides power to the pump via a 3-phase power cable. The downhole unit includes sensors, such as temperature sensors, pressure sensors, vibration sensors, voltage sensors, and a flow meter using differential pressure sensors. The downhole unit transmits sensor data to the surface unit via frequency modulated carrier signals. The signals are transmitted via a capacitive connection across each phase of the motor windings of the motor of the electric submersible pump. Additionally, in some embodiments control data is transmitted from the surface unit to the downhole unit The downhole unit includes various components, including a digital signal processor, a multiplexer and modulator, filters, and amplifiers. The carrier signals for carrying sensor data are generated at three separate frequencies, modulated with encoded data, and transmitted across each motor winding via a capacitive coupling. The surface unit includes a digital signal processor, a multiplexer and modulator, filters, and amplifiers, and receives the carrier signals from the 3-phase power cable connected to the electric submersible pump. The surface unit de-multiplexes and demodulates the carrier signals. This provides the sensor data to be input into a computer coupled to the surface unit. By comparing the measured amplitudes of the carriers, the presence and/or location of cable and/or phase faults may be detected.

FIG. 1 depicts a system 100 having a well 102 below a surface 104 in accordance with an embodiment of the present invention. The system 100 includes production tubing 106 extending downhole in the well to a subterranean resource 108, such as an oil or natural gas reservoir. As will be appreciated, at the surface, the production tubing 106 may be connected to various control and regulation devices (e.g., a "Christmas tree"), pipes, and other components for producing the oil or other resources.

An electric submersible pump (ESP) 110 may be coupled to the downhole end of the production tubing 106. The electric submersible pump may pump the oil or other resource of the subterranean resource 108 through the production tubing 106 to the production equipment at the surface 104 (e.g., as a part of an artificial lift system). The ESP 110 is connected to and receives power from a 3-phase power cable 112 that provides power to the ESP 110 for operation. The 3-phase power cable 112 is coupled to an ESP controller 114 at the surface 104. The ESP controller 114 may provide control and power to the electronic submersible pump 110 via the 3-phase power cable 112.

System 100 may include a data measurement system 116 in accordance with the embodiments described further below. The data measurement system 116 includes a downhole unit (DHU) 118 coupled to the electric submersible pump 110. For example, in some embodiments the DHU 118 may be inside the electric submersible pump assembly and may be mounted at the bottom of the motor of the pump. The DHU 118 may include data measurement sensors (S) 120. The sensors 120 may include various sensors for measuring pressure, temperature, vibration, voltage or other parameters as discussed below.

The data measurement system 116 also includes a surface unit (SU) 122 located at the surface 104 and that may be a part of the ESP controller 114. As described further below, the SU 122 may include capacitively or inductively coupled attachments that receive communication and control data from the 3-phase power cable 112 (e.g., via surface wiring) and connect to a surface communications system, such as by filters and voltage control. In some embodiments, the SU 122 is coupled to a computer 124. The computer 124 may include a desktop computer, a laptop computer, a tablet computer, a smartphone, or other computers. The computer 124 may include one or more processors, volatile memory (e.g., RAM), non-volatile memory (e.g., hard drive, a solid state drive, and so on), a display, a network interface, input and output devices, and various other components. The computer 124 may execute analysis software for displaying and manipulating sensor data, control software for controlling the components of the SU 122 and the DHU 118, and other software used in the operation of the data measurement system 116.

Figure 2:
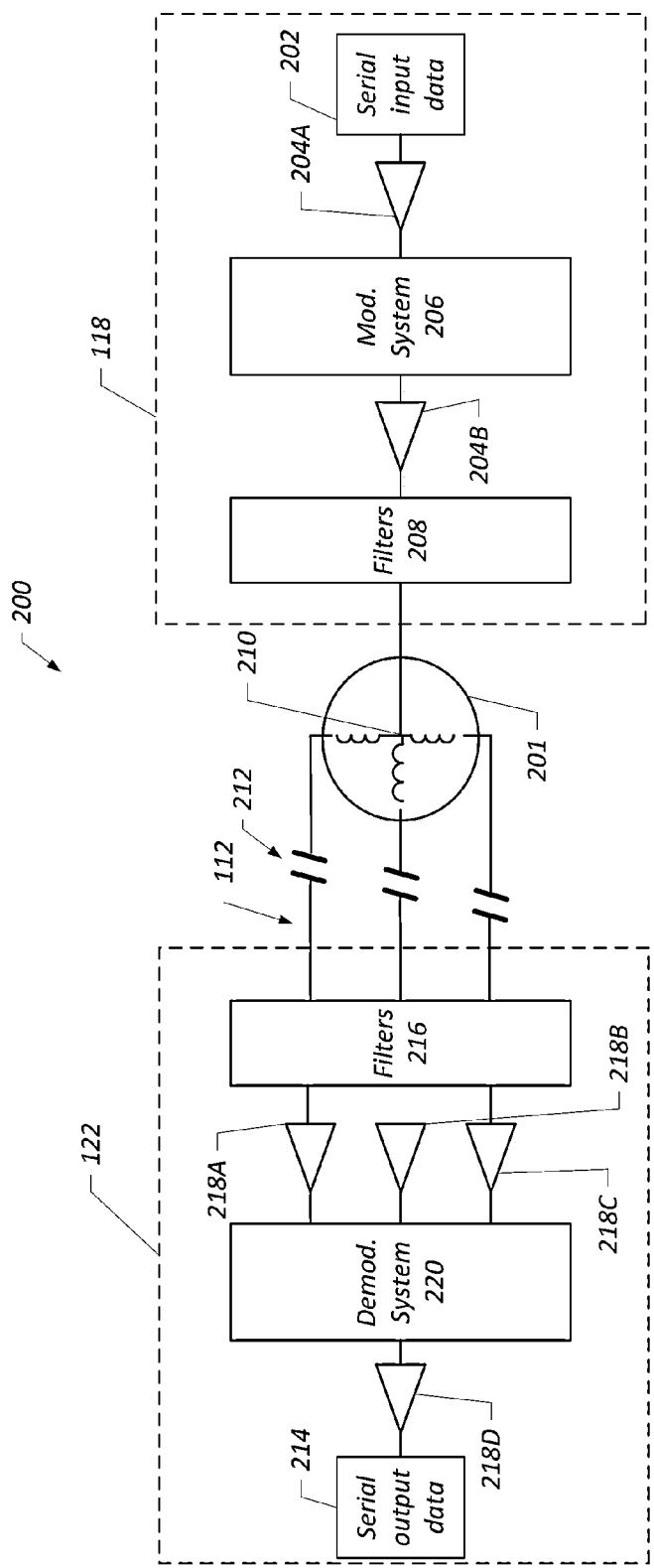
FIG. 2 is a schematic diagram of a surface unit and a downhole unit of a data measurement system in accordance with an embodiment of the present invention.

FIG. 2 is a simplified schematic diagram 200 illustrating the connection between the DHU 118, a motor 201 of the ESP 110, and the SU 122. As shown in FIG. 2, the DHU 118 receives serial input data 202, such as from sensors coupled to the DHU 118. The DHU also include amplifiers 204 (e.g., line drivers), a multiplexer and modulator 206, and filters 208. The sensor data carrier signals are provided via the amplifier 204A, the multiplexer and modulator 206, the second amplifier 204A, and then through the line filters 208 to the motor 201. In some embodiments, the multiplexer and modulator 206 is a modified asynchronous digital subscriber line (ADSL) type broadband multiplex and modulation system. The DHU 118 is connected to a Y point 210 (also referred to as the "star point") of the motor 201 of the ESP 110, and the carrier signals are of sufficiently high frequency to connect across the parasitic capacitance that exists in parallel to each phase of the motor winding (as shown by capacitive connection 212). Thus, the carrier signals that transmit data to the surface shunt the motor windings via capacitive connection 212 onto the 3-phase power cable 112 and are not conducted through the motor windings themselves. Thus, the data rate encoded on the transmitted carrier signals is not limited by the inductive impedance of the motor 201 windings, enabling an increased transmission rate of sensor data.

As shown in the schematic diagram 200, the carrier signals are transmitted through the 3-phase power cable 112 to the surface and the SU 122. As described below, the transmission of the carrier signals is achieved by tuning the carrier frequencies to match the impedance of the windings of the ESP motor 201 and the 3-phase power cable 112. Additionally, ( ) the connection to the motor 201 may be a single point onto the Y-point 210 of the motor. In some embodiments, the AC voltage occurring at the Y-point may be used as a current source to power a monitor of the ESP 110.

It should be appreciated that any number of carrier signals may be transmitted in either direction, e.g., from the DHU 118 to the SU 122 or from the SU 122 to the DHU 118. Each carrier signal transmitted from the DHU 118 to the SU 122 may carry identical data, e.g., the sensor data received from the sensors of the DHU 118. In some embodiments, four carrier signals at four different frequencies are used. In such embodiments, the carrier signals may include a first carrier at 64 kHz, a second carrier at 96 kHz, a third carrier at 128 kHz, and a fourth carrier at 160 kHz. In such embodiments, the first three carrier signals may each carry identical data, e.g., sensor data, from the DHU 118 to the SU 122, and the fourth carrier signal may carry control data from the SU 122 to the SHU 118. As described below, the amplitudes of the carrier signals are used to determine the condition of the power phases and to provide a wide system bandwidth to cope with different motor and power cable characteristics.

As mentioned above, in some embodiments, an additional carrier signal may be used to carry control data from the SU 122 to the DHU 118. The control data may be used to control actuators below the motor of the ESP 110 and to set data acquisition parameters such as signal gain. In such embodiments, the control data carrier signal may have the same data rate capability as the carrier signals that transfer data from the DHU 118 to the SU 122. Thus, in some embodiments having four carrier signals, the first three carrier signals (e.g., carrier 1, carrier 2, and carrier 3) may be used to carry sensor data and the fourth carrier signal may be used to carry control data.

The SU 122 receives the carrier signals from the DHU 118 and outputs serial output data 214 to external devices, such as to the computer 124. The SU 122 may include line filters 216, amplifiers 218, and a de-multiplexer and demodulator 220. The carrier signals are received at the line filters 216 and amplified via amplifiers 218A, 218B, and 218C before being provided to the multiplexer and demodulator 220. The demodulator 220 locks on to the carrier frequencies and recovers the original signal used to modulate the carriers. The demodulated signal is then amplified via amplifier 218D and output as serial output data 214. Additionally, as described below, the amplitude of the carrier signals may be analyzed to evaluate line or phase problems.

Figure 3:
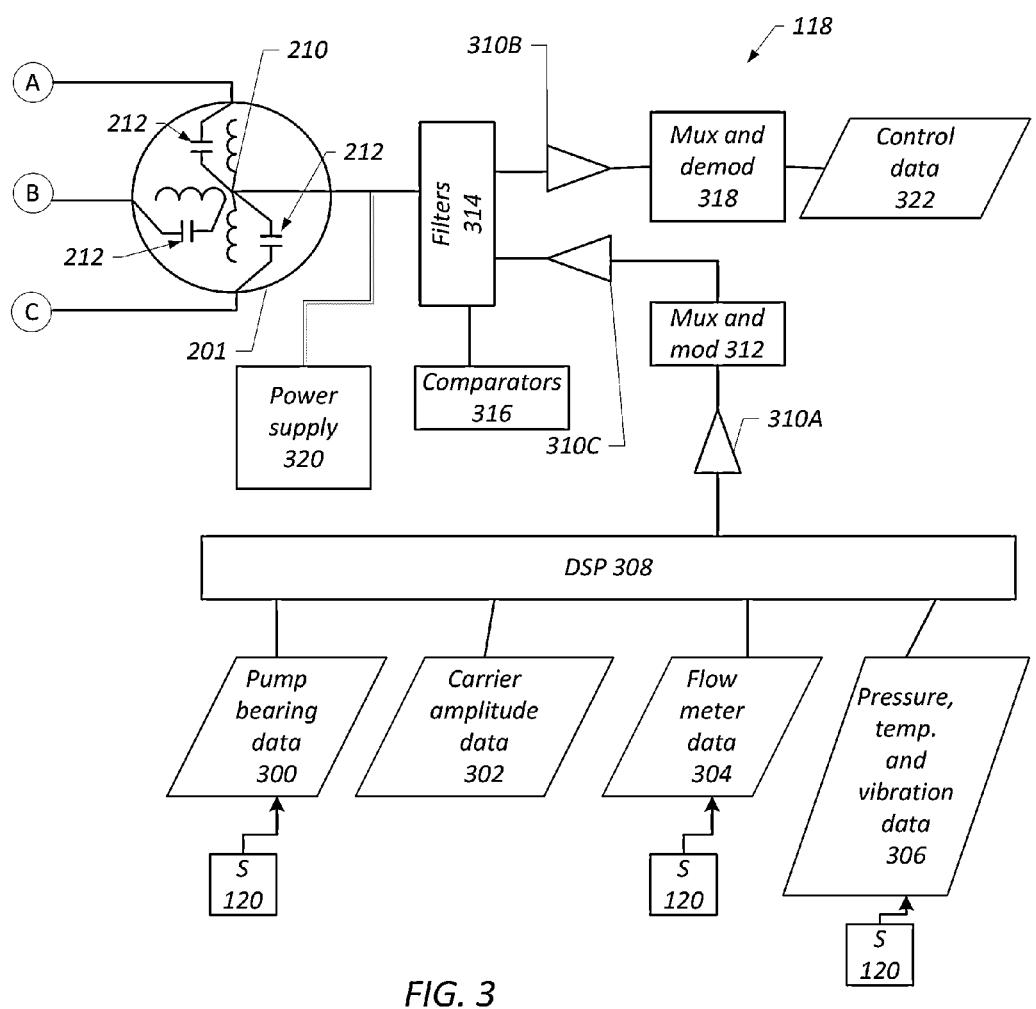
FIG. 3 is a schematic diagram of a downhole unit of a data measurement system in accordance with an embodiment of the present invention.

FIG. 3 depicts a detailed schematic of the DHU 118 in accordance with an embodiment of the present invention. The DHU 118 may include sensors that transmit sensor data via a connection to the Y-point 210 of the ESP motor 201 via the components described below. As mentioned above, the DHU 118 may include various sensors 120 that provide data measurement of different parameters. The sensors 120 may include pressure sensors (e.g., quartz type, strain gauge type), temperature sensors, vibration sensors, voltage and current sensors, and a differential pressure sensor array for a flow meter. In some embodiments, the differential pressure sensor array may include four pressure transducers. In some embodiments, the sensors 120 may include: two pressure sensors, two temperature sensors, two vibration sensors, four pressure sensor for a flow meter, and four voltage and current sensors. The data measured by the sensors 120 may include pump bearing data 300, carrier amplitude data 302, flow meter data 304, and pressure, temperature, and vibration data 306.

The DHU 118 generates the carrier signals for the sensor data and may include phase protection and power supplies for sensors and actuators. In some embodiments, the sensor data is updated every second, every two seconds, every three seconds, every four seconds, or every five seconds or greater. In some embodiments, three carrier signals are generated for carrying signal data from the DHU 118 to the surface. In some embodiments, the three carrier signals are frequency modulated carriers of 64 kHz, 96 kHz, and 128 kHz separated by 32 kHz guard bands. In some embodiments, the carrier signals are modulated as direct digital data or frequency shift keying (FSK) digital tones. In such embodiments, side bands may be developed that are separated in each carrier spectrum by about 16 kHz. Moreover, in some embodiments the three carrier signals are delayed in the time domain to ensure that two carrier signals will be ahead of or delayed on an occurrence of power switching at a data transition point of the third carrier signal. Additionally, the carrier signals' frequencies are completely independent of the power line frequencies of the 3-phase power cable 112.

The DHU 118 includes a digital signal processer (DSP) 308, amplifiers 310 (e.g., line drivers), a multiplexer and modulator 312, an input-output filter 314, carrier amplitude comparators 316, a multiplexer and demodulator 318, and a power supply 320. The data 300, and 306 may be acquired and processed by the digital signal processor (DSP) 308. The DSP 308 may manage the sensor data and include data filtering, gain, and offset. The data is amplified via the amplifier 310A and provided to a multiplexer and modulator 312. The multiplexer and modulator 312 generate frequency modulated carrier signals that are then amplified via amplifier 310B and provide to the input-output filter 314. In some embodiments, the multiplexer and modulator 312 is a modified asynchronous digital subscriber line (ADSL) type broadband multiplex and modulation system. As mentioned above, the DHU 118 also includes the power supply 320 that may provide power to the sensors 120, actuators, and other components of the DHU 118.

The three carrier signals described above each carry identical data and provide redundancy and an ability to cope with a wide range or motors and cable types, as the different carrier frequencies are affected differently by the motor parasitic capacitances and the power cable capacitances. The three carriers signals are multiplexed (e.g., via multiplexer and modulator 312) and, as described above, are transmitted to the surface across the capacitive effect 212 inherent in the motor windings (of the ESP motor and via the 3-phase power cable 112. Advantageously, as the data is identical in all three power phases, a partial or total failure of up to two of the phases does not prevent the sensor data from reaching the surface. Consequently, the data measurement system described herein provides immunity to ground faults at the motor or the surface. The carrier signals are provided from the input-output filter 314 to the ESP motor and, as described above, are transmitted via capacitive connections 212 across the windings of the ESP motor and onto the 3-phase power cable 112. As described above, the DHU 118 is capacitively coupled to the Y-point 210 of the ESP motor 201. In some embodiments, there is an additional capacitive coupling between the output of the DHU transmitter circuitry and the Y-point of the ESP motor to prevent the DC offset from affecting the transmitters. Additionally, the RMS or peak-to-peak amplitudes of the carrier signals are monitored and measured at the surface (e.g., via comparators 316). As described herein, the monitoring of the amplitudes of the carrier signals may provide information regarding the health or issues of each phase of the 3-phase power transmission to the ESP motor 201.

In some embodiments, as mentioned above, an additional frequency modulated carrier signal is used to carry control data between the surface and the DHU 118. The control data carrier signal may be transmitted on the 3-phase power cable 112 across the capacitive effect 212 inherent in the motor windings via the connection to the Y-point 210 of the motor 201 and across the capacitive coupling (protecting the DHU transmitters from DC offset at the 'Y' Point) to the DHU 118. In such embodiments, the control data carrier signal may be demodulated (e.g., by demodulator 318) to obtain control data 322. In some embodiments, the multiplexer and modulator 318 is a modified asynchronous digital subscriber line (ADSL) type broadband multiplex and modulation system. The control data may include commands for adjusting the parameters of the DHU 118 and performing remedial diagnostics.

Figure 4:
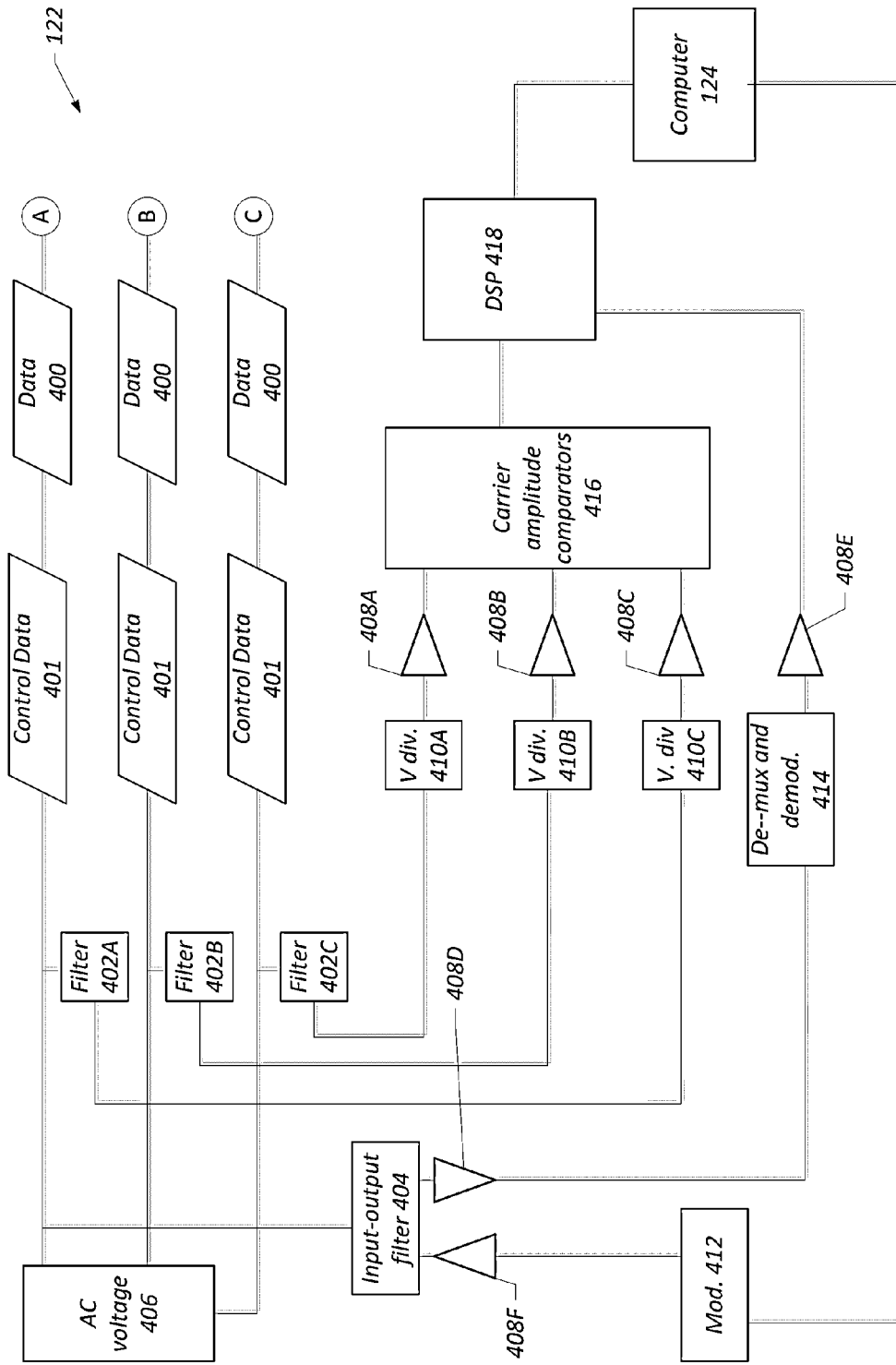
FIG. 4 is a schematic diagram of a surface unit of a data measurement system in accordance with an embodiment of the present invention.

FIG. 4 depicts a schematic diagram of the SU 122 in accordance with an embodiment of the present invention. As shown in FIG. 4, the SU 122 includes output filters 402, input-output filters 404, AC supply voltage 406, amplifiers 408 (e.g., line drivers), voltage dividers 410, multiplexer and modulator 412, multiplexer and modulator 414, carrier amplitude comparators 416, and a DSP 418. Additionally, the computer 124 mentioned above is coupled to the SU 122. The SU 122 is connected to AC voltage 406 that provides power to the ESP 110 and, in some embodiments, to the DHU 118 via the 3-phase power cable 112. As mentioned above, the SU 122 may be an enclosure having the components described below and may reside inside the controller 114 for the ESP 110. In some embodiments, the SU 122 may include serial interfaces and network interfaces (e.g., TCP/IP interfaces) for connection to external networks.

The SU 122 receives data 400 (e.g., sensor data received from the DHU 118) via the carrier signals transmitted over the 3-phase power cable 112. In some embodiments, the data 400 may include, for example, two temperatures, two pressures, three vibrations, four differential pressures, three voltages (e.g., Y-point voltage and power supplies). In some embodiments, as mentioned above, the data 400 may be updated every second, every two second, every three seconds, every four seconds, or every five seconds or greater. Advantageously, as mentioned above the sensor data 400 is replicated on each line of the 3-phase power cable providing redundancy in the event that of one or more lines fail Additionally, as mentioned above, control data 401 may be transmitted from the SU 122. The SU 122 may be connected to the lines of the 3-phase power cable 112 by direct connection or via clip-on coupling transformers. Additionally, as described herein, the SU 122 may transmit command data to the DHU 118.

Each phase of the incoming carrier signals may be received and filtered by the output filters 402 and provided to the voltage dividers 410. Additionally, the carrier signals are received and filtered by the input-output filter 404. After the voltage dividers 410, the carrier signals are amplified (via amplifiers 408A, 408B, and 408C) and provided to carrier amplitude comparators 416. The carrier amplitude comparators 416 may output phase condition data based on the amplitudes of the carrier signals to the DSP 418. The phase condition data may enable determination of the location of cable or phase fault. The relative amplitude levels recovered at the SU 122 provide a proportional amplitude/distance from the surface, thus enabling determination of the location of a failure. For example, if the amplitude of the carrier signal on phase B is 25% of the amplitude of the of phases A and C, then evaluating the source impedance of the phase B carrier signal will provide a distance from the surface where the amplitude reduction took place and, thus, where in the failure occurred.

The carrier signals are also received and filtered by input-output filter 404, amplified via amplifier 408D, and then de-multiplexed and demodulated (e.g., by de-multiplexer and demodulator 414) to extract the sensor data from the carrier signal. In some embodiments, the de-multiplexer and modulator 414 is a modified asynchronous digital subscriber line (ADSL) type broadband multiplex and modulation system. The sensor data is then amplified via amplifier 408E and provided to the DSP 418. The sensor data may then be provided to the computer 124 for analysis. The computer 124 may display the sensor data in various formats for viewing and evaluation by a user of the computer 124. The computer 124 may include, for example, carrier amplitude data analysis software, sensor data logging and analysis software, and other software. Additionally, in some embodiments the data may be communicated to external computers or networks via serial interfaces or network interfaces of the SU 122.

Additionally, in some embodiments control data may be provided from the computer 124 to the DHU 118. In such embodiments, the frequency modulated carrier signal for the control data is generated via the modulator 412 and then amplified via amplifier 408F. In some embodiments, the modulator 412 is a modified asynchronous digital subscriber line (ADSL) type broadband multiplex and modulation system. The amplified control data carrier signal is transmitted through the input-output filter 404, on to the 3-phase power cable 112 to be received by the DHU 118 (order of things happening). Additionally, in some embodiments the command data may include control data for well components below the ESP 110, such as solenoid and motor drives. Moreover, such components may be powered by connecting to the Y-point of the motor of the ESP 110.

In some embodiments, the command data carrier signal is a 160 kHz carrier signal and may be modulated as direct digital data or as FSK data. Here again, side bands may be developed that are separated by about 16 kHz in the carrier pass-band spectrum. The control data is extracted from the connection at the Y-point of the motor of the ESP 110 and provided to the DHU 118.

In some embodiments, the SU 122 may also include a power supply to provide power in the event that the 3-phase power to the ESP 110 is turned off and the ESP 110 is not running. In such embodiments, the power supply may be a DC power source on all of the power phases and may be isolated by current trips or isolators to ensure protection against ground faults or line breakages in the phases of the 3-phase power cable 112. Thus, the data measurement system described herein may be able to provide sensor data in the event of a full phase fault or even two phase faults. In some embodiments, the SU 122 may provide low voltage DC power to the sensors of the DHU 118 even if the ESP 110 is shutdown, and the DC power may be pass through the motor windings of the ESP motor and be received by the DHU 118 as a normal power supply.

Figure 5:
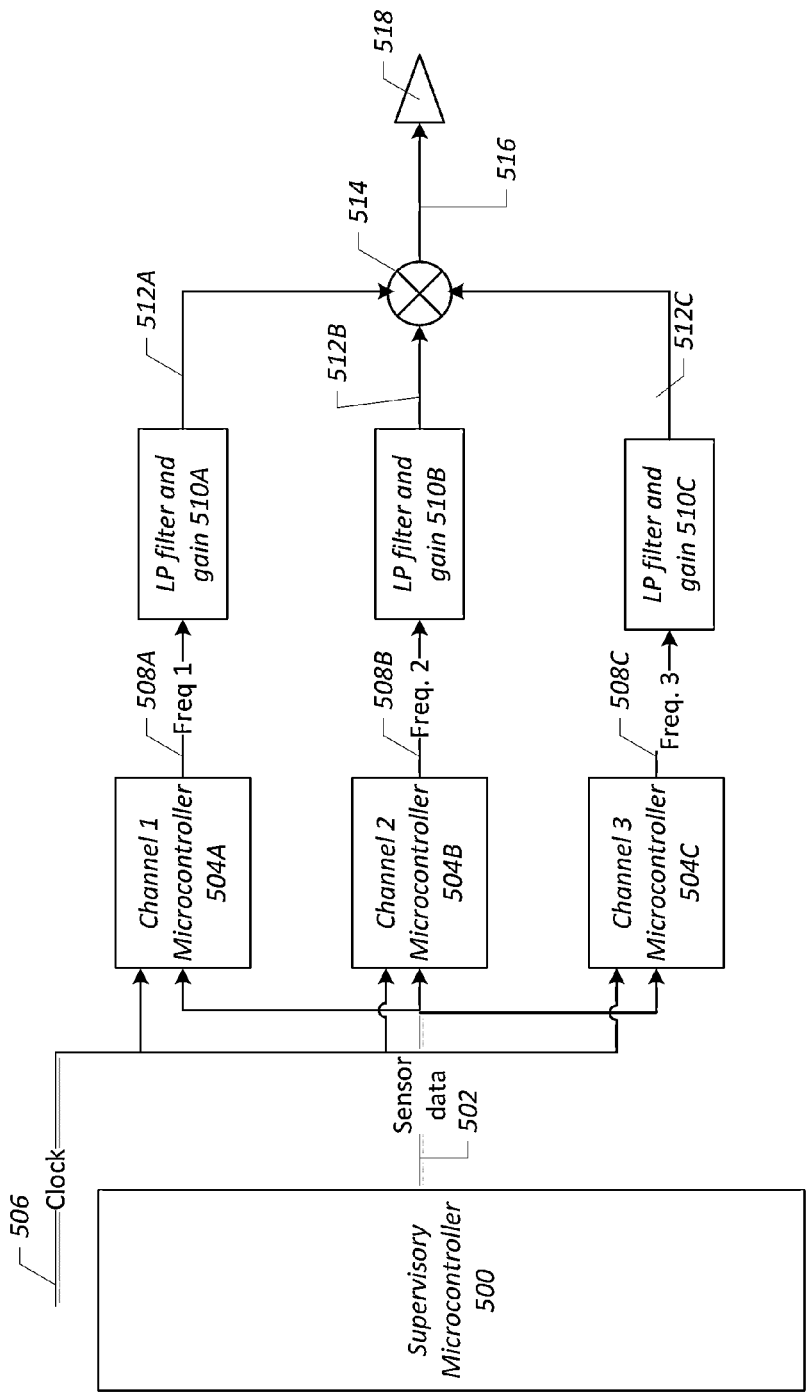
FIG. 5 is a schematic diagram of the transmission of carrier signals in accordance with an embodiment of the present invention.

FIG. 5 depicts transmission of the carrier signals in accordance with an embodiment of the present invention. As shown in FIG. 5, various microcontrollers may be used to process and transmit the carrier signals. As shown in the figure, a supervisory microcontroller 500 may transmit digitized and auxiliary sensor data 502 to three microcontrollers 504 (e.g., Channel 1 microcontroller, Channel 2 microcontroller, and Channel 3 microcontroller). In some embodiments, the microcontrollers may be implemented in the DSP described above. Additionally, a clock signal 506 is transmitted to the microcontrollers 504 and be used to time the outputs from the microcontrollers 504. Each of the microcontrollers 504 may encode data as a frequency deviation from the carrier center frequency. In some embodiments, the carrier frequencies are selected according to the Instrumentation Group (IRIG) C constant bandwidth series. For example, in some embodiments the carrier deviation is +/−8 kHz. Thus, in such embodiments, for a 64 kHz carrier signal a logical "0" deviates the carrier signal to 60 kHz and a logical "1" deviates the carrier signal to 68 kHz. In some embodiments, the microcontrollers 504 may be clocked at 8 MHz and may have a timing resolution of 250 ns. In such embodiments, the microcontrollers 504 may derive a highest carrier frequency of 128 kHz. In some embodiments having three carrier signals for carrying signal data, the carrier frequencies and timing deviations used are as follows in Table 1:

TABLE 1

Carrier Frequencies and Timing deviations

| Carrier frequency | Timing deviation |
|---|---|
| 128 kHz (120 kHz <> 136 kHz) | 980 ns |
| 96 kHz (88 kHz <> 102 kHz) | 1.56 uS |
| 64 kHz (56 kHz <> 72 kHz) | 3.96 uS |

The timing granularity of the carrier signals may be controlled by the clock speed of the microcontrollers 504, thus determining the absolute accuracy of the deviated carrier frequency. For FSK modulated carrier signals having binary logic values, the absolute accuracy may not be a primary consideration. In other embodiments, the microcontrollers 504 may be clocked to higher speeds (e.g., up to 25 MHz) if finer resolution or higher carrier frequencies are used.

The carrier signals 508 are output from each microcontroller 504 and provided to low-pass filter and gain circuits 510. In some embodiments, the carrier signals are synthesized as square wave frequencies and are filtered to create sinusoidal waveforms. The low-pass filter and gain circuits 508 may receive gain control signals from the supervisory microprocessor 500. The configuration of the gain control signals may be received via the command data transmitted from the SU 122. The gain control signals may enable adjustment of the amplitude of the individual carriers. The filtered carrier signals 512 are multiplexed with a multiplexer 514 and the multiplexed signal 516 is coupled to the transmission interface via an amplifier (e.g., line driver 518).

Figure 6:
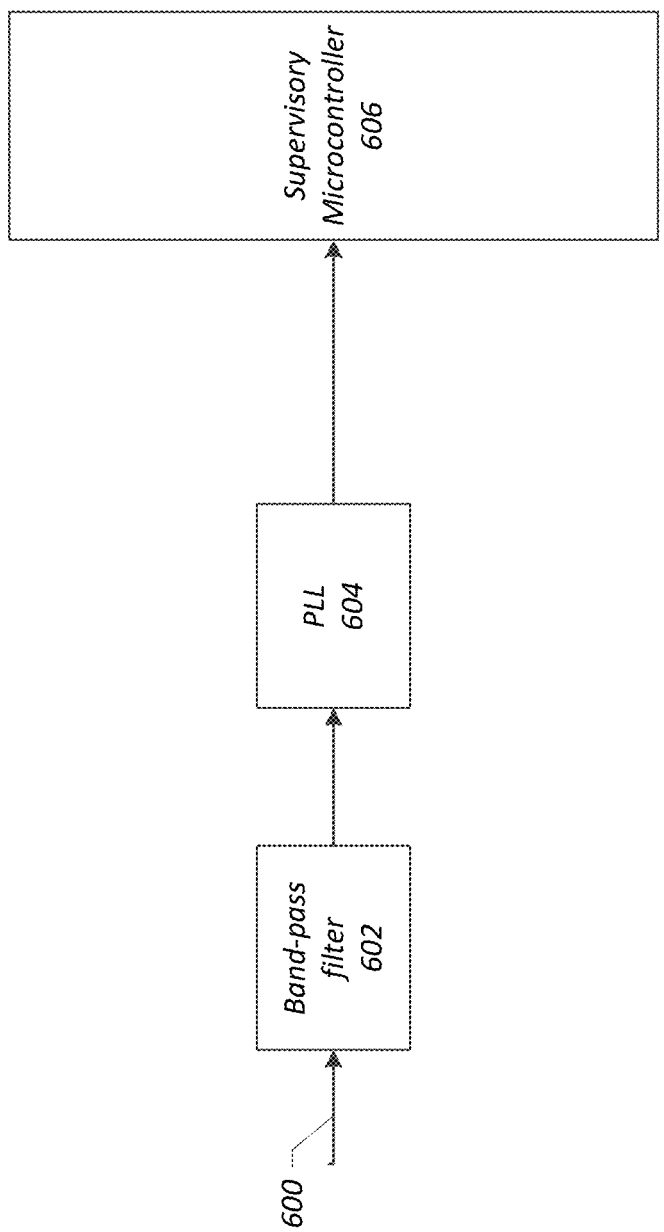
FIG. 6 is a schematic diagram depicting decoding of a command data carrier signal in accordance with an embodiment of the present invention.

As mentioned above, command data may also be transmitted via another carrier signal from the SU 120 to the DHU 118. FIG. 6 depicts decoding of the command data carrier signal in accordance with an embodiment of the present invention. The command data carrier signal 600 may be provided via a line interface to a band-pass filter 602. The command data carrier signal 600 is extracted via the band-pass filter 602 and provided to a phase-locked loop 604. The phase locked loop 604 may demodulate the received control data. The demodulated control data is then provided to a supervisory microcontroller 606 for further processing. For example, commands from the control data may be provided to the appropriate component, e.g., a sensor, actuator, or other component, for execution of a command. The components illustrated in FIG. 6 may be implemented in the components of the DHU 118 described above, such as the DSP 308.

Figure 7:
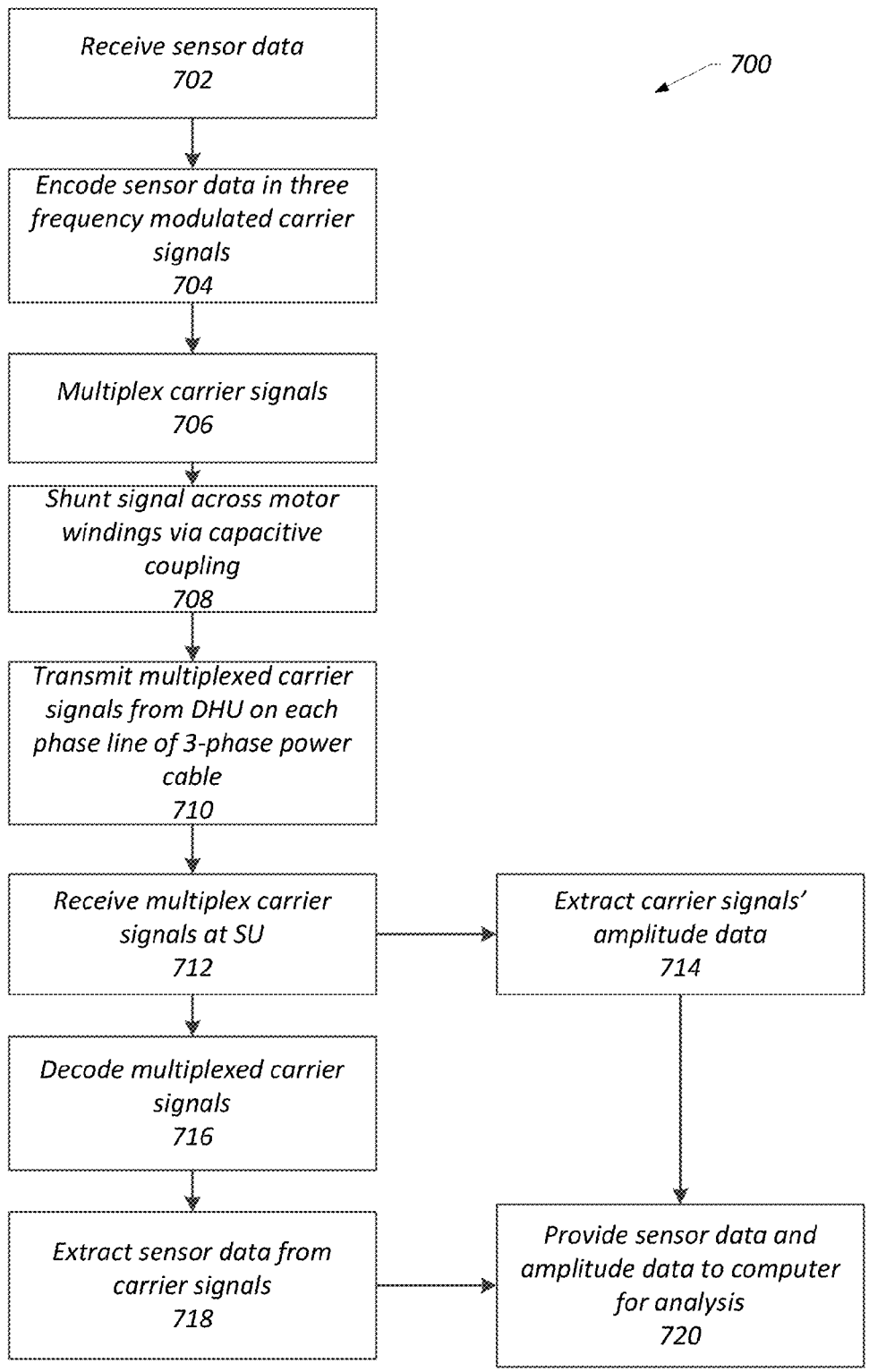
FIG. 7 is a block diagram of a process for generation and transmission of sensor data in accordance with an embodiment of the present invention.

FIG. 7 depicts a process 700 for generation and transmission of sensor data in accordance with an embodiment of the present invention. Initially, sensor data may be received from various sensors (block 702). As described above, the sensor data may include for example, two temperatures, two pressures, three vibrations, four differential pressures, three voltages (e.g., Y-point voltage and power supplies), and carrier amplitude levels. Next, the sensor data is encoded in three frequency modulated carrier signals (block 704). As described above, the signals may be modulated to three separate carrier frequencies separated by, for example, 32 kHz guard bands. Thus, in some embodiments the three carrier signals may be modulated to frequencies of 64 kHz, 96 kHz, and 128 kHz. Next, the three carrier signals are multiplexed (block 706). The multiplexed carrier signals are shunted across each motor winding of a 3-phase ESP motor via a capacitive coupling (block 708). The multiplexed carrier signals are transmitted from the DHU on each phase line of the 3-phase power cable coupled to the ESP motor (block 710). It should be appreciated that other actions used in the generation and transmission of sensor data, such as amplification, filtering, and other signal processing may also be performed, as described above in the discussion of the DHU 118.

The transmitted carrier signals are received at the SU on each line of the 3-phase power cable (block 712). The carrier amplitude data for each carrier signal may be extracted from the multiplexed carrier signals (block 714). The multiplexed carrier signals are also decoded, e.g., demodulated (block 716), and sensor data is extracted from the carrier signals (block 718). Next, the extracted sensor data and amplitude data is provided to a computer coupled to the SU for further analysis (block 720). For example, as described above, the location of line or phase faults may be determined from the comparisons of the carrier signals' amplitude data. It should be appreciated that other actions used on the receiving and decoding the carrier signals, such as amplification, filtering and other signal processing may also be performed, as described above in the discussion of the SU 122. Additionally, other carrier signals transmitted from the SU to the DHU, such as a control data carrier signal, may be generated and transmitted in a manner similar to that described above, with the generation and transmission occurring at the SU 122 and the receiving and decoding occurring at the DHU 112.

Although embodiments described above may refer to three carrier signals for transmission of sensor data and a fourth carrier signal for transmission of control data, it should be appreciated that more or fewer numbers of carrier signals may be used with the techniques described above. For example, in other embodiments five, six, seven, eight, or more carrier signals may be used. Such additions may be performed to increase update rate, add redundancy or both. Additionally, more or fewer sensors may also be included in the data measurement system described above, with a corresponding increase or decrease in the sensor data received at the DHU and transmitted to the SU.

In some embodiments, a non-isolated downhole electronics power supply may be used in the ESP system described above. As described further below, the power supply may provide DC power sourced from the 3-phase ESP motor star point (e.g., the Y-point 210 described above). In some embodiments, the power supply may receive a 30-40 V DC input voltage and provide regulated DC output voltages of 5 V (at 0.5 A) and 24 V (at 2.0 A). In such embodiments, the power supply may provide 10 W of DC output power and may not include any DC output isolation. Advantageously, the power supply may be compatible with low frequency FM modems signaling via the input power line.

In some embodiments, the power supply includes one or more very low frequency (VLF) input filters that incorporate over-voltage protection. As will be appreciated, such VLF input filters may admit low voltage DC power. Additionally, the input impedance of the front-end input filter may be "high" over the signal bandwidth of a communications modem coupled to the power lines such that signal propagation is not attenuated. Moreover, the input impedance may be yet "higher" over the 30-70 Hz high voltage AC power spectrum, such that AC power is rejected with a residue of no more than a fraction of a volt transmitted though the input filter to the downhole electronics power supply DC input.

Figure 8:
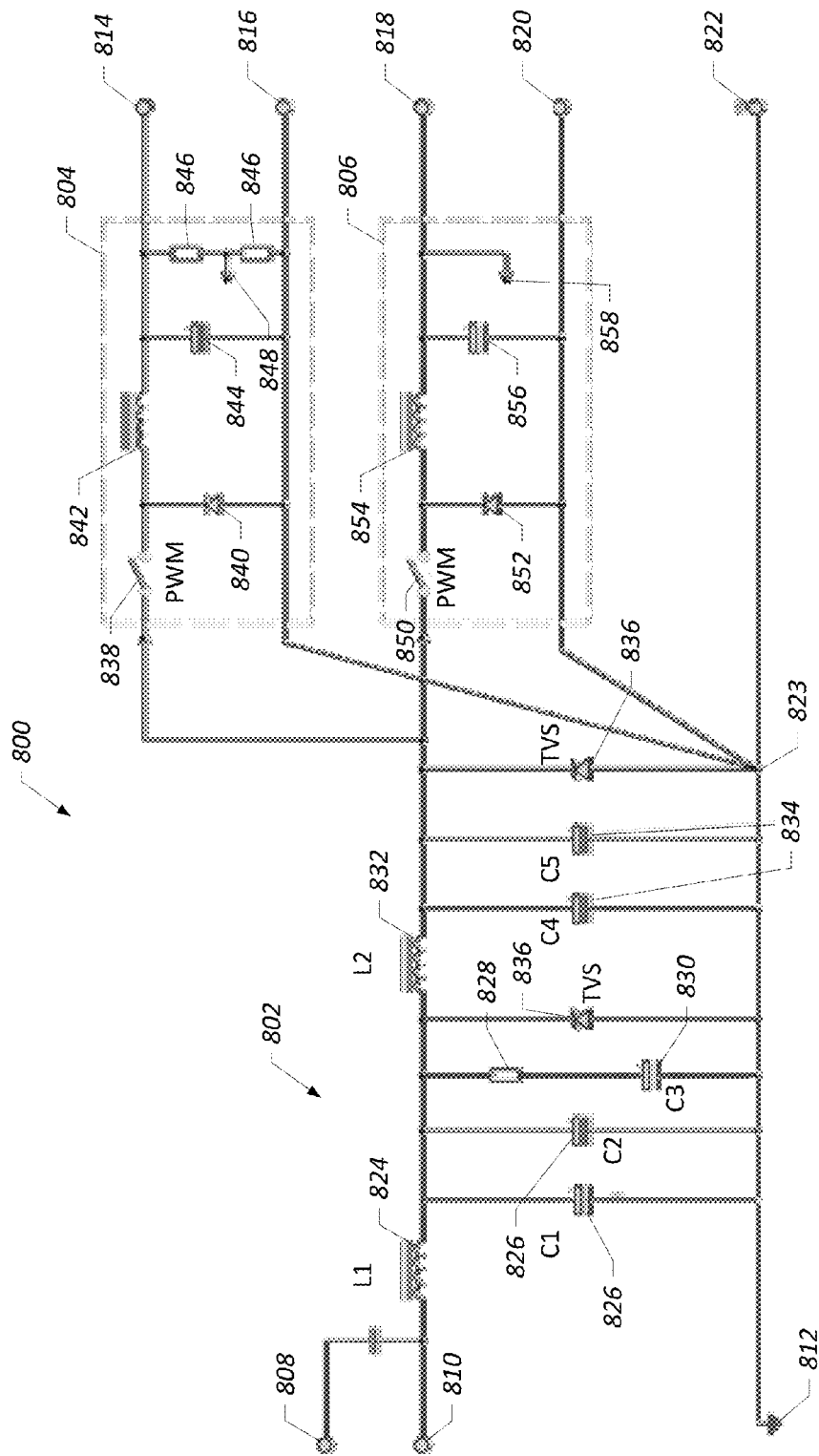
FIG. 8 is a schematic diagram of an input filter and buck step-down regulator circuit for a non-isolated downhole electronics power supply in accordance with an embodiment of the present invention.

With the foregoing in mind, FIG. 8 depicts an input filter and buck step-down regulator circuit 800 having over-voltage protection for a non-isolated downhole electronics power supply in accordance with an embodiment of the present invention. The circuit 800 includes a VLF input filter 802, a +24 V DC buck step down regulator 804, and a +5 V DC buck step-down regulator 806. As shown in FIG. 8, the circuit 800 includes an input 808 to a communication modem filters interface and an input 810 to a power source (e.g., the Y-point 210 of the ESP motor described above). The circuit 800 includes a ground 812 via earth, production tubing, or both. The outputs from the circuit 800 include a +24 V DC output 814 and return 816, a +12 V DC output 818 and return 820, and a 0 V output 822. The circuit 800 includes a DC power star point 823.

The VLF input filter 802 includes a second order LC filter with a non-dissipative damper. In some embodiments, the VLF input filter 802 may achieve a −3 dB corner at 0.3 Hz and around −80 dB attenuation at 30 Hz, thus transmitting at no more than about 0.5 V peak AC if subjected to 5$k$ V peak sine at that frequency. In such embodiments, the input filter inductor may shunt 3 Hz communications signals with an inductive reactance in excess of 1 k ohm. As shown in FIG. 8, the input filter 802 includes an input filter inductor 824 (L1) and capacitors 826 (C1 and C2). Additionally the input filter includes a non-dissipative damper that includes resistor 828 (R1) and capacitor 830 (C3). The input filter 802 also includes a second input filter inductor 832 (L2) and capacitors 834 (C4 and C5). In some embodiments, the second input filter inductor 832 may be a high frequency ferrite cored component that may prevent the switching regulators from conducting high frequency interference back to the power line and the modems. Additionally, the second input filter inductor 832 may prevent any external high frequency interference from being conducted into the power supply inputs. In some embodiments, the inductor 824 (L1) may have an inductance of 64 H, the capacitors 826 (C1 and C2) may have a capacitance of 2200 uF, the inductor 832 (L2) may have an inductance of 250 uH, and the capacitors 834 (C4 and C5) may have a capacitance of 100 uF.

As mentioned above, the power supply having the circuit 800 draws DC power input from the star point of the ESP motor but remains serviceable in the event of a failure of one of the three phases. During such a failure, significant levels of 30-70 Hz AC may be present on the DC power input. In some embodiments. As specified, such components may pass DC and achieve a 0.3 Hz corner frequency with the stop-band producing around −80 dB attenuation at 30 Hz, such that unwanted 30 Hz 5 kV peak AC received at the power input is rendered to a residual of only 0.5 V peak superimposed on the desired DC input to the buck step-down regulators 804 and 806.

The input filter 802 also includes unidirectional transient voltage suppressors 836. The transient voltage suppressors 836 may protect the switching regulators of the circuit 800. For example, as shown in FIG. 8, one of the transient voltage suppressors 836 may be placed in parallel with the input filter capacitors 826 to prevent the input voltage from turning negative in the event of a high voltage AC event and to prevent a positive transient voltage from exceeding about +50 V.

As mentioned above, the circuit 800 includes a +24 V buck step-down regulator 804 and a +5 V buck step-down regulator 806. Each of the regulators 804 and 806 may draw current from the common input filter 802, but each regulator regulates independently of each other. Advantageously, as described below, the design of each regulator 804 and 806 may be similar to reduce design cost. In such embodiments, the differences between the regulators 806 and 806 may include different output current limiter value settings and different feedback factors to achieve the different outputs (e.g., +5 V DC and +24 V DC) from each regulator. The buck regulators 804 and 806 may be operated in continuous (inductor) conduction model, such that the DC output current ripples with a shallow triangle wave at the higher output levels. Although the input currents to the circuit 800 pulsate, the input filter 802 is used to average the pulsating input currents.

As will be appreciated, the +24 V buck step-down regulator 804 includes a pulse width modulation (PWM) switch 838, a diode 840, an inductor 842, a capacitor 844, and resistors 846. The regulator 804 also provides feedback 848 for control of the regulator 804. Similarly, the +12 V buck step-down regulator 806 includes a PWM switch 850, a diode 852, an inductor 854, and a capacitor 856. Here again, the regulator 806 may provide feedback 858 for control of the regulator 806. In some embodiments, the buck power regulators may include an L296 switching regulator manufactured by STMicroelectronics of Geneva Switzerland. A LM257gHV switching regulator manufactured by Texas Instruments of Dallas, Tex., or a LT1074HV switching regulator manufactured by Linear Technology of Milpitas, Calif. Such embodiments may limit the input DC voltage to below 40 V via the transient voltage suppressors and maintain the DC input voltage above 30V to ensure adequacy duty cycle headroom for the 24 V DC regulator.

Figure 9:
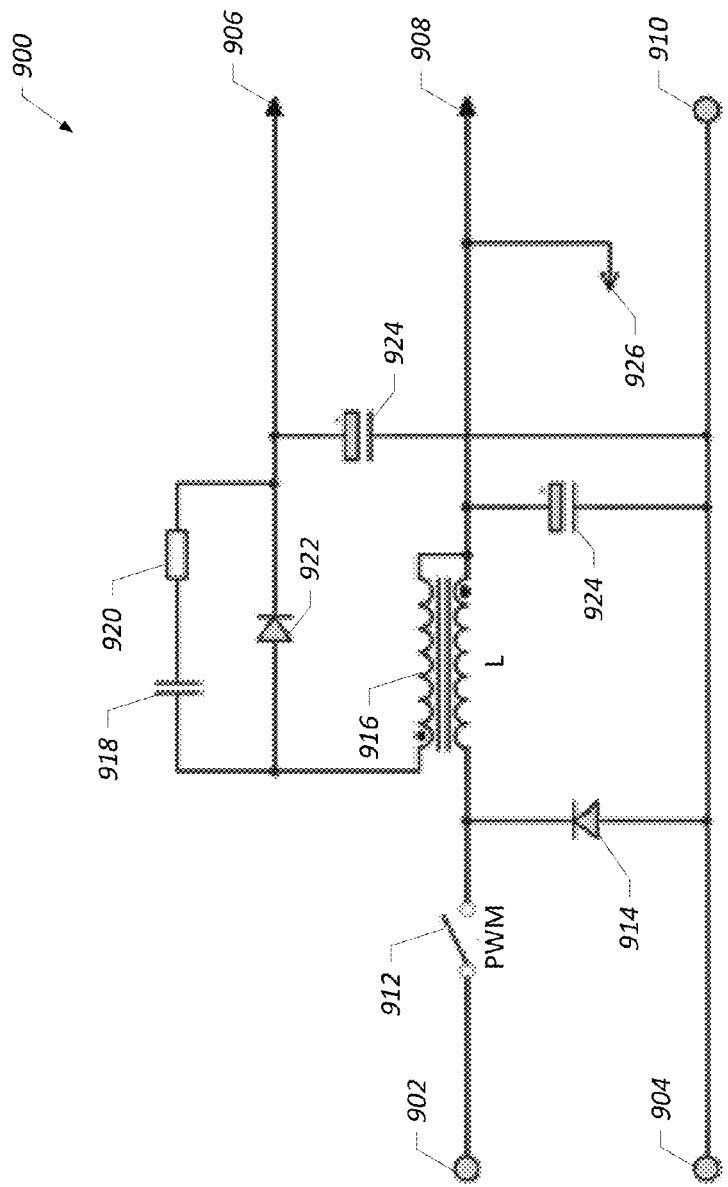
FIG. 9 is a schematic diagram of a multiple output buck step-down regulator circuit in accordance with an embodiment of the present invention.

Alternatively, in some embodiments, the power supply may include a multiple output buck step-down regulator. FIG. 9 depicts a circuit 900 of a multiple output buck step-down regulator in accordance with an embodiment of the present invention. As shown in FIG. 9, the circuit 900 includes a DC input 902 and a return 904. The circuit 900 also includes a +24 V DC output 906, a +12 V DC output 908, and a 0V output 910. As will be appreciated, the circuit 900 includes a PWM switch 912, a diode 914, and an inductor 916, a capacitor 918, a resistor 920, and a diode 922. The circuit 900 further includes capacitors 924. The inductor 916 may have a second winding and rectifier used to provide an auxiliary output. However, as will be appreciated, power available from the auxiliary output may be limited less than 20% of the main output power and will also vary with the 5 V output power demand. The circuit 900 may provide feedback 926 for control of the multiple output buck step-down regulator.

Figure 10:
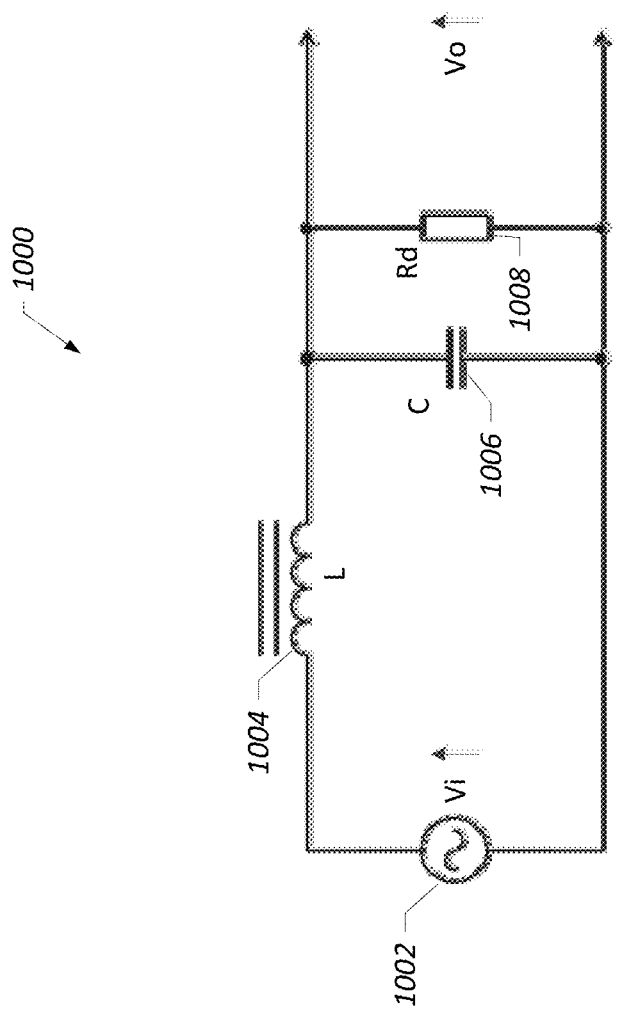
FIG. 10 is a schematic diagram of a passive very low frequency (VLF) filter circuit with dissipative damping in accordance with an embodiment of the present invention.
Figure 11:
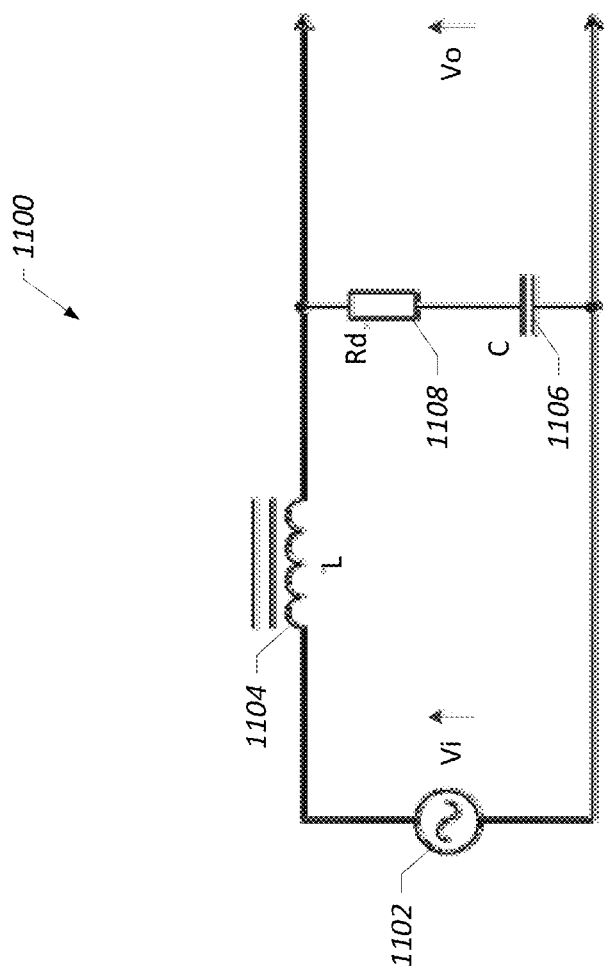
FIG. 11 is a schematic diagram of a VLF filter circuit with non-dissipative damping in accordance with an embodiment of the present invention.

As will be appreciated, the peak 30 Hz residual AC voltage present at the output of a VLF input filter may vary with the value of the input inductor. In some embodiments, the input inductor may carry about ½ A DC without saturating and may be undesirably large. FIGS. 10 and 11 illustrate such variance for passive VLF filters with dissipative damping and non-dissipative damping respectively. FIG. 10 depicts a circuit 1000 of a passive VLF filter with dissipative damping in accordance with an embodiment of the present invention. The circuit 1000 receives an input voltage 1002 (Vi) and includes an inductor 1004, a capacitor 1006, and a resistor 1008. Equations 1, 2, 3, and 4 illustrate the behavior of the circuit 1000 illustrated in FIG. 10. The transfer function is shown below in Equation 1 as follows:

$$H = \frac{Vo}{Vi} = \frac{1}{\left(1 + S \cdot \frac{L}{Rd} + S^2 LC\right)} \quad (1)$$

Where H is the transfer function, Vo is the output voltage, Vi is the input voltage, L is the inductor of the inductor 1004, Rd is the resistance of the resistor 1008, and C is the capacitance of the capacitor 1006.

The natural frequency of the corner is shown below in Equation 2 as follows:

$$\omega n = \frac{1}{LC} \text{ or } fn = \frac{1}{(2\pi LC)} (\text{Hz}) \quad (2)$$

Where ωn or fn is the natural frequency. The damping factor is shown below in Equation 3 as follows:

$$\zeta = \frac{1}{2Rd} \cdot \sqrt{\frac{L}{C}} \quad (3)$$

Where ζ is the damping factor. Accordingly, the magnitude of the transfer function is shown below in Equation 4 as follows:

$$|H| = \frac{1}{\sqrt{(1-(2\pi f)^2) + \left(\frac{2\pi fL}{Rd}\right)^2}} \quad (4)$$

Where |H| is the magnitude of the transfer function. By setting ζ=1, setting C=4400 uF, setting Rd to keep ζ=1, and varying L, the output from the VLF input filter for varying inductor values may be determined. Table 2 shown below compiles the values for the conventionally damped filter (e.g., by shunt load) shown in FIG. 10. As shown in Table 2 below, the damper resistance Rd has been recalculated for each inductor value L to prevent any uncontrolled resonance. The damper resistance values for a unity damping factor (ζ=1) are reduced with the inductance values, as shown below in Table 2:

TABLE 2

| Inductance Values | | | | |
|---|---|---|---|---|
| L | Rd | fn | \|H\| @30 Hz Sine | Vp peak@30 Hz Sine |
| 64H | 60R | 0.3 Hz | 0.0001 (−80 dB) | 0.5 Vpk |
| 16H | 30R | 0.6 Hz | 0.0004 (−68 dB) | 2 Vpk |
| 4H | 15R | 1.2 Hz | 0.0016 (−56 dB) | 8 Vpk |
| 1H | 7.5R | 2.4 Hz | 0.0064 (−44 dB) | 32 Vpk |
| 250 mH | 3.75R | 4.8 Hz | 0.025 (−32 dB) | 125 Vpk |
| 64 mH | 2R | 9.5 Hz | 0.092 (−21 dB) | 460 Vpk |
| 16 mH | 1R | 19 Hz | 0.3 (−10 dB) | 1484 Vpk |
| 4 mH | 0.5R | 38 Hz | 0.64 (−4 dB) | 3200 Vpk |
| 1 mH | 0.25R | 76 Hz | 0.88 (−1 dB) | 4520 Vpk |

As mentioned above, FIG. 11 depicts a circuit 1100 of a passive VLF filter with non-dissipative damping in accordance with an embodiment of the present invention. The circuit 1100 receives an input voltage 1102 (Vi) and includes an inductor 1104, a capacitor 1106, and a resistor 1108. Equations 5, 6, 7, and 8 illustrate the behavior of the circuit 1100 illustrated in FIG. 11. The transfer function is shown below in Equation 5 as follows:

$$H = \frac{Vo}{Vi} = \frac{(1+S \cdot CRd)}{(1+S \cdot CRd + S^2 \cdot LC)} \quad (5)$$

Where H is the transfer function, Vo is the output voltage, Vi is the input voltage, L is the inductor of the inductor 1004, Rd is the resistance of the resistor 1008, and C is the capacitance of the capacitor 1006.

The natural frequency of the corner is shown below in Equation 2 as follows:

$$\omega n = \frac{1}{\sqrt{LC}} \text{ or } fn = \frac{1}{\left(2\pi \sqrt{LC}\right)} (\text{Hz}) \quad (6)$$

Where ωn or fn is the natural frequency. Accordingly, the magnitude of the transfer function is shown below in Equation 4 as follows:

$$|H| = \sqrt{\frac{(1+2\pi fCRd)^2)}{((1-(2\pi f)^2 LC)^2 + (2\pi fCRd)^2)}} \quad (7)$$

Where |H| is the magnitude of the transfer function. By setting C=4400 uF, setting Rd for constant damping, and varying L, the output from the VLF input filter for varying inductor values may be determined. Table 3 shown below compiles the values for the filter circuit 1100 with non-dissipative damping as shown in FIG. 11. As will be appreciated, such a filter may be used to prevent desired DC current from being robbed by a shunt damper as used in the circuit 1000 depicted in FIG. 10. As shown in Table 3 below, the damper resistance Rd has been recalculated for each inductor value to prevent any uncontrolled resonance. The damper resistance values are reduced with the inductance values, as shown below in Table 3:

TABLE 3

| Inductance Values | | | | |
|---|---|---|---|---|
| L | Rd | fn | \|H\| @30 Hz Sine | Vp peak@30 Hz Sine |
| 64H | 60R | 0.3 Hz | 0.005 (−46 dB) | 25 Vpk |
| 16H | 30R | 0.6 Hz | 0.01 (−40 dB) | 50 Vpk |
| 4H | 15R | 1.2 Hz | 0.02 (−34 dB) | 100 Vpk |
| 1H | 7.5R | 2.4 Hz | 0.04 (−28 dB) | 200 Vpk |
| 250 mH | 3.75R | 4.8 Hz | 0.08 (−22 dB) | 400 Vpk |
| 64 mH | 2R | 9.5 Hz | 0.18 (−15 dB) | 890 Vpk |
| 16 mH | 1R | 19 Hz | 0.39 (−8 dB) | 1930 Vpk |
| 4 mH | 0.5R | 38 Hz | 0.7 (−3 dB) | 3480 Vpk |
| 1 mH | 0.25R | 76 Hz | 0.9 (−1 dB) | 4520 Vpk |

As shown above, inductor values of a few mH may result in the filter corner frequency rising above 30 Hz, and an inductor value of 1 mH would result in the corner frequency exceeding 70 Hz with no attenuation benefit. Thus, the inductance value may only be reduced by a few mH before the AC residue amplitude exceeds the DC power supply voltage, subjecting electrolytic capacitors used in the filter to reversed polarity on the negative half cycles and resulting in capacitor failure.

Figure 12:
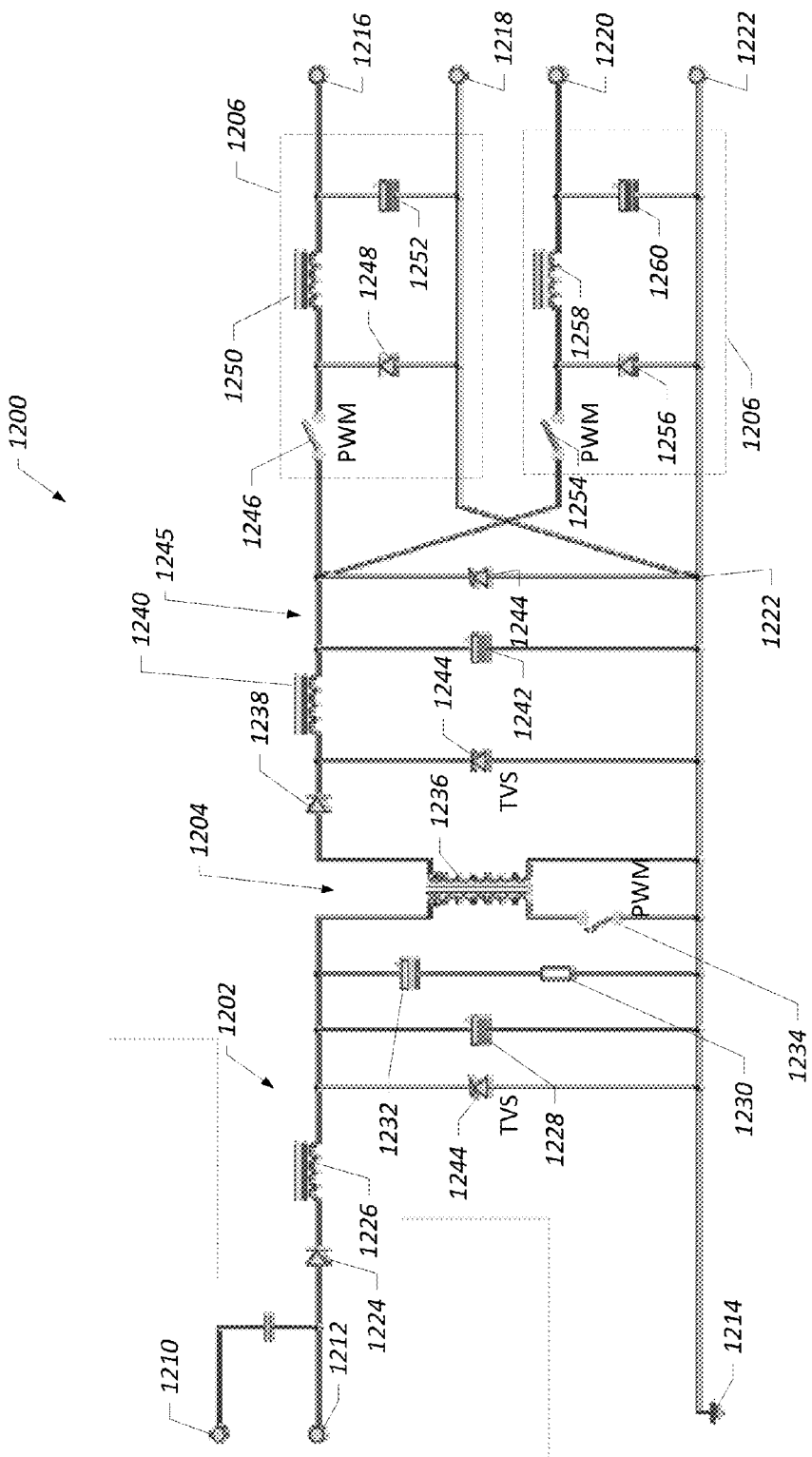
FIG. 12 is a schematic diagram of a two-stage switching regulator for a non-isolated downhole electronics power supply in accordance with an embodiment of the present invention.

In view of the foregoing discussion, FIG. 12 depicts a circuit 1200 having a two stage switching regulator for a non-isolated downhole electronics power supply in accordance with an embodiment of the present invention. In some embodiments, the circuit 1200 may operate from a DC power input of around 70 V and may operate up to a DC power input voltage of 100V or higher, 200V or higher, 300V or higher, and so on. As described below, the power input is accepted via a steering diode and is thus capable of operating from AC input power or a combination of AC and DC input power.

The circuit 1200 includes an input filter 1202 (e.g., an LC filter), a switching pre-regulator 1204, a +24 V DC buck step-down regulator 1206 and a +5 V buck step-down regulator 1208. The circuit 1200 includes an input 1210 to a communication modem data interface and an input 1212 to a power source (e.g., the Y-point 210 described above). In some embodiments, the input 1212 may receive +70V DC and 30-70 Hz AC. The circuit 1200 includes a ground 1214 via earth, production tubing, or both. The outputs from the circuit 1200 include a +24 V DC output 1216 and return 1218 and a +12 V DC output 1220. The circuit 1200 includes a DC power star point 1222.

As shown in FIG. 12, the circuit 1200 includes a steering diode 1224, and the input filter 1202 includes an inductor 1226, and a capacitor 1228 that may serve as a hold-up reservoir. The input filter 1202 may block backward conducted emissions of interference from the switching regulators to the input power interface. Additionally, the filter may also smooth any rapid input voltage variations that the pre-regulator 1204 control loops may be otherwise incapable of tracking. The input filter 1202 may also prevent external noise from entering into the switching pre-regulator 1204. The circuit 1200 also includes a non-dissipative damper that includes resistor 1230 and capacitor 1232. As mentioned above, the circuit 1200 includes a switching pre-regulator 1204 that includes a PWM switch 1234 (e.g., a δ1 PWM low side switch) and a transformer 1236. In some embodiments, the switching pre-regulator 1204 may include an isolated single switch forward converter. The circuit 1200 further includes a diode 1238, an inductor 1240, and a capacitor 1242. The circuit 1200 may also include multiple transient voltage suppressors 1244.

The switching pre-regulator 1204 may accept a wide range of input voltages and may generate an intermediate regulated DC voltage 1245. In some embodiments, the intermediate regulated DC voltage is about 35 V. The intermediate DC voltage provides a stable DC input voltage for the buck step-down regulators 1206 and 1208. Thus, the risk of excessive voltages being applied to the buck step-down regulators 1206 and 1208 is minimized, and the effect of line voltage variations on the output regulators control loops is also minimized. Thus, in some embodiments the control loop of the switching pre-regulator 1204 may be mainly performing line voltage regulation. The gate of the power switches of the switching pre-regulator 1204 may be driven directly from the PWM driver relative to the 0 volts power return. In some embodiments, a line voltage may be applied feed-forward to the pre-regulator 1204 control loop or the control loop may be operated with current mode control.

As shown in FIG. 12, the regulators 1206 and 1208 may be isolated single switch step-down regulators. The +24 V DC buck step-down regulator 1206 includes a PWM switch 1246 (e.g., a δ2 PWM switch), a diode 1248, an inductor 1250, and a capacitor 1252. Similarly, the +12 V DC buck step-down regulator 1208 includes a PWM switch 1254 (e.g., a δ3 PWM switch), a diode 1256, an inductor 1258, and a capacitor 1260. The PWM control circuits of the regulators 1206 and 1208 may run directly from the internal intermediate DC (e.g., 35 V DC) described above, and the high side power switches of the regulators 1206 and 1208 may also operate from the same internal DC. The PWM control circuit of the pre-regulator 1204 may also include a start-up power supply derived from the power input interface. After starting, the control circuit may then be powered by the internal intermediate DC voltage described above or, in some embodiments, an auxiliary winding on the pre-regulator transformer.

As will be appreciated, the operating switching frequency of the pre-regulator circuit 1200 may be kept as high as possible to minimize the sizes and values of the filter components, consistent with the power switches' commutation losses being no greater than their conduction losses. In some embodiments, the switching frequency may be about 100 kHz, resulting in a switching period of about 10 microseconds. In such embodiments, the pre-regulator circuit 1200 may accept a 70 V DC input power supply, from which it may operate with an approximately 50% duty cycle resulting in the intermediate 35 V DC regulated output. As will be appreciated, the relationship between output voltage and duty cycle is shown below in Equation 8 as follows:

$$Vout = \delta \cdot Vin \qquad (8)$$

Where Vout is the output voltage, Vin is the input voltage, and δ is the duty cycle. As the input line voltage rises, the pre-regulator control loop may reduce the operating duty cycle, thus keeping a constant intermediate output voltage of approximately 35 V (Vout=35 V). By assuming that a power MOSFET takes about 150 nanoseconds to switch fully on and about 150 nanoseconds to switch fully off, the absolute minimum duty cycle at which the pre-regulator may be operated in switched mode may be determined according to Equation 9 as follows:

$$\delta min \geq \left(\frac{(2*150 \text{ ns})}{10 \text{ }\mu s}\right) * 100\% = \geq 3\% \qquad (9)$$

Thus, if the input voltage approached about 1100 V the pre-regulator power switch state could never become fully enhanced. In such instances, the pre-regulator may suffer massive commutation losses as a result of the power switch state being confined to a dynamic linear mode for 3% of the switching period and off for the other 97% of the switching period. Because the flux reset process of an isolated forward convertor subjects the power switch to a voltage in excess of the input power line voltage, a margin may be provided when selecting the power switch voltage rating.

In some embodiments, the pre-regulator may include a MOSFET manufactured by IXYS Corporation of Milpitas, Calif., International Rectifier Corporation of El Segundo, Calif., or Toshiba Corporation of Tokyo Japan. Such embodiments may operate with a line voltage up to about 600 V. In some embodiments, the pre-regulator may include a SGL40N150DTU IGBT manufactured by Fairchild Semiconductor of San Jose, Calif., and such embodiments may provide for higher line voltages. In other embodiments, if the pre-regulator operates at higher AC voltages in the region of several kilovolts, then the pre-regulator may include a three-phase step-down transformer and rectifier.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A data measurement system coupled to an electric submersible pump (ESP), the system comprising:
   a surface unit coupled to a 3-phase power cable, the 3-phase power cable coupled to a 3-phase motor of the ESP;
   a downhole unit coupled to the motor of the ESP and located downhole in a well, the downhole unit comprising:
   a plurality of sensors;
   a processor coupled to the sensors and configured to receive the sensor data; and
   a modulator coupled to the processor and configured to generate at least three frequency modulated carrier signals for carrying the sensor data to the surface unit, each of the plurality of frequency modulated carrier signals carrying identical sensor data and modulated to a unique frequency;
   wherein the downhole unit is capacitively coupled to motor windings of the motor of the ESP and configured to transmit the at least three carrier signals across the capacitive coupling and to the surface unit via the 3-phase power cable
   wherein the downhole unit comprises a non-isolated power supply, wherein the non-isolated power supply comprises:
   an input filter configured to accept input power from a Y-point of the ESP;
   a switching pre-regulator coupled to the input filter and configured to provide a first DC voltage;
   a buck step-down post-regulator coupled to the switching pre-regulator and configured to receive the first DC voltage, the buck step-down post-regulator configured to provide a second output DC voltage and a third output DC voltage, wherein the second output DC voltage is less than the first DC voltage and the third output DC voltage is less than the second output DC voltage.

2. The data measurement system of claim 1, wherein the surface unit comprises:
   a demodulator configured to demodulate the at least three carrier signals; and
   a processor configured to extract sensor data from the demodulated carrier signals.

3. The data measurement system of claim 1, wherein the surface unit comprises:
   a modulator configured to provide a frequency modulated control data carrier signal, wherein the surface unit is configured to transmit the control data carrier signal across the capacitive coupling and to the downhole unit via the 3-phase power cable.

4. The data measurement system of claim 3, wherein the frequency modulated control data carrier signal comprises a carrier signal at 160 kHz.

5. The data measurement system of claim 1, wherein the surface unit comprises:
   a plurality of voltage dividers; and
   a plurality of carrier amplitude comparators configured to extract carrier amplitude data from the at least three carrier signals.

6. The data measurement system of claim 1, comprising a computer coupled to the surface unit, wherein the surface unit transmits sensor data to the computer.

7. The data measurement system of claim 6, wherein the surface unit receives control data from the computer.

8. The data measurement system of claim 1, wherein the surface unit is housed in an enclosure of a controller for the ESP.

9. The data measurement system of claim 1, wherein the surface unit is coupled to an AC voltage source.

10. The data measurement system of claim 1, wherein the at least three frequency modulated carrier signals comprises a first carrier signal at 64 kHz, a second carrier signal at 96 kHz, and a third carrier signal at 128 kHz.

11. The data measurement system of claim 1, wherein the modulator coupled to the processor is configured to generate the at least three frequency modulated carrier signals via frequency shift keying.

12. The data measurement system of claim 1, wherein the plurality of sensors comprises of: a temperature sensor, a pressure sensor, a vibration sensor, and a voltage sensor.

13. The data measurement system of claim 1, wherein the plurality of sensors comprises a flow meter comprises a differential pressure sensor having a plurality of differential pressure transducers.

* * * * *